(12) United States Patent
Yoshitake et al.

(10) Patent No.: US 9,588,524 B2
(45) Date of Patent: Mar. 7, 2017

(54) VIBRATION CONTROL DEVICE AND CONTROL METHOD THEREFOR

(75) Inventors: Yutaka Yoshitake, Nagasaki (JP); Shuhei Kajiwara, Tamano (JP)

(73) Assignees: NAGASAKI UNIVERSITY, Nagasaki-shi (JP); MITSUI ENGINEERING & SHIPBUILDING CO., LTD., Tokyo (JP)

( * ) Notice: Subject to any disclaimer, the term of this patent is extended or adjusted under 35 U.S.C. 154(b) by 337 days.

(21) Appl. No.: 14/241,835

(22) PCT Filed: May 16, 2012

(86) PCT No.: PCT/JP2012/062531
§ 371 (c)(1),
(2), (4) Date: Feb. 27, 2014

(87) PCT Pub. No.: WO2013/031304
PCT Pub. Date: Mar. 7, 2013

(65) Prior Publication Data
US 2014/0229021 A1    Aug. 14, 2014

(30) Foreign Application Priority Data
Aug. 30, 2011    (JP) .................................. 2011-187893

(51) Int. Cl.
*G05D 19/02*    (2006.01)
*F16F 7/10*    (2006.01)

(52) U.S. Cl.
CPC ............ *G05D 19/02* (2013.01); *F16F 7/1011* (2013.01); *F16F 7/1022* (2013.01)

(58) Field of Classification Search
CPC ...... G05D 19/02; F16F 7/1005; F16F 7/1011; F16F 7/1022; F16F 15/02; F16F 15/027
See application file for complete search history.

(56) References Cited

U.S. PATENT DOCUMENTS 5,209,326 A * 5/1993 Harper .................. F16F 7/1005
188/378

FOREIGN PATENT DOCUMENTS

| JP | 63-293283 A | 11/1988 |
| JP | 2001-304330 A | 10/2001 |
| JP | 2009-103147 A | 5/2009 |
| JP | 2010-180669 A | 8/2010 |

OTHER PUBLICATIONS

International Search Report dated Jul. 24, 2012, issued in corresponding application No. PCT/JP2012/062531.

* cited by examiner

*Primary Examiner* — Vishal Sahni
(74) *Attorney, Agent, or Firm* — Westerman, Hattori, Daniels & Adrian, LLP

(57) ABSTRACT

Provided is a vibration control device, which enables the vibrations of a vibrating body, such as a rotary machine, to automatically be suppressed, without installing a vibration detection sensor on the vibration control device or vibrating body, and without controlling the rotational speed or phase of the vibration control device. The vibration control device (1), which is installed on a vibrating body (2) and controls the vibrations of the vibrating body (2), comprises a rotating shaft (11), a mass body (12) that is fixed to the rotating shaft (11), and an activation apparatus (13) that adds the power of a rotational motion, which is centered on the rotating shaft (11), to the mass body (12).

5 Claims, 4 Drawing Sheets

VIBRATION CONTROL DEVICE AND CONTROL METHOD THEREFOR

TECHNICAL FIELD

The present invention relates to a vibration control device mounted on a vibrating body and suppressing its vibration and a control method therefor.

BACKGROUND ART

A rotary machine such as a hard disk of a personal computer, an electric fan, a cutting device, and a power generation turbine is preferably designed with its imbalance as small as possible, and careful balancing is performed before shipment. However, since there is a limit to balancing of the rotary machine, an external force of a centrifugal force type is generated during an operation, and vibration occurs. Furthermore, there are also machines which inevitably generate large imbalance during its operation due to its performances as in the case of an electric washing machine and reciprocating machines which inevitably generate vibration to some degree due to its structure as in the case of an engine. In order to suppress vibration of these machines (hereinafter referred to as a vibrating body), an automatic balancer and a vibration compensator are proposed (see Patent Literature 1, for example).

FIG. 8 illustrates an example of an automatic balancer 1X. This automatic balancer 1X has a circumferential passage 30 having the same central axis as that of a rotary machine 32 (a centrifugal separator and the like, for example) and a balance modifier 31 movably arranged in the passage 30. Here, outline arrows indicate vibration direction Z of the rotary machine 32.

Subsequently, an operation of the automatic balancer 1X will be described. This automatic balancer 1X can suppress vibration of the rotary machine 32 by passive movement of the balance modifier 31 in the rotating passage 30 and relative standstill in the passage 30 when vibration occurs in the rotary machine 32. At this time, a position where the balance modifier 31 relatively stands still after it moves in the passage 30 is passively changed depending on an amplitude and a vibration frequency of the rotary machine 32.

On the other hand, the vibration compensator has a vibration detection sensor for detecting vibration of a machine such as a diesel engine and the like, a plurality of rotatable mass bodies arranged at appropriate positions in the machine, and a motor for changing a rotational speed or phase of each of the mass bodies. This vibration compensator can suppress vibration of the machine, by detecting vibration of the machine by the vibration detection sensor, by sending a control signal to each of the motors, and by changing the rotational speed or phase of each of the mass bodies.

However, the above-mentioned automatic balancer and the vibration compensator have some problems. First, the automatic balancer has a problem in which it amplifies an amplitude of the machine in a region with a vibration frequency (frequency) lower than a resonant frequency (or a resonance point).

Second, the automatic balancer has a problem in which self-excited vibration is generated in a region of a vibration frequency higher than the resonance point. That is, although the automatic balancer has a function of automatically suppressing vibration, the balance modifier and the like cannot be positively controlled, and thus vibration of the machine might be amplified in some cases.

Third, the vibration compensator requires a precise motor or a complicated control mechanism, and thus has a problem of a high cost.

CITATION LIST

Patent Literature

PTL 1: Japanese Patent Laid-Open No. 2001-304330

SUMMARY OF INVENTION

Technical Problem

The present invention has been made in view of the above-mentioned problems and has an object to provide a vibration control device which can automatically suppress vibration of the vibrating body without installing a vibration detection sensor on a vibrating body such as a rotary machine, a reciprocating machine or the like, or the vibration control device, or without controlling a rotational speed or phase of the vibration control device. Furthermore, an object of the present invention is to provide a low-cost vibration control device.

Solution to Problem

In order to achieve the above-mentioned object, a vibration control device according to the present invention, installed in a vibrating body and controlling vibration of the vibrating body includes a rotating shaft, a mass body fixed to the rotating shaft, and an activation apparatus which adds power of a rotational motion around the rotating shaft to the mass body.

With this configuration, the vibration control device can automatically suppress vibration of the vibrating body without control of a rotational speed or phase. This vibration control device can automatically suppress vibration of the vibrating body by executing control of adding an initial velocity to the mass body only at start-up.

In the above-mentioned vibration control device, the vibration control device has at least the two mass bodies which can rotate independently of each other and having a structure in which relative positions of the mass bodies in a rotating direction are automatically adjusted. With this configuration, the mass body of the vibration control device has its relative positional relationship automatically adjusted so as to be optimal for vibration control in accordance with an amplitude amount and frequency characteristics of the vibrating body. As a result, a vibration control performance of the vibration control device is largely enhanced.

In the above-mentioned vibration control device, the vibration control device has a power assist mechanism for offsetting rotation resistance of the mass body, the power assist mechanism having a power source for adding the power to the rotating shaft or the mass body and a control mechanism, the control mechanism having a reading mechanism for detecting a vibration frequency of the vibrating body, a control map for determining the power the power source should add to the rotating shaft or the mass body from the vibration frequency of the vibrating body and an output control mechanism for outputting the determined power to the rotating shaft or the mass body from the power source.

With this configuration, not only can a rotation period of the mass body in the vibration control device be synchronized with a vibration period of the vibrating body without a delay, but also the mass body can be rotated with an optimal phase, and the vibration control performance can be enhanced. This is because rotation resistance of the mass body can be offset by the power assist mechanism.

A control method for the vibration control device according to the present invention in order to achieve the above-mentioned object is a control method for a vibration control device installed in a vibrating body and controlling vibration of the vibrating body and having a rotating shaft, a mass body fixed to the rotating shaft, an activation apparatus for adding power of a rotational motion around the rotating shaft to the mass body, and a power assist mechanism for offsetting rotation resistance of the mass body, the method including a reading step of reading a vibration frequency of the vibrating body by the power assist mechanism, an output determining step of determining the power to be added to the mass body from a control map prepared in advance, and an output control step of adding the power determined in the output determining step to the mass body. With this configuration, the same working effects as the above can be obtained.

Advantageous Effects of Invention

According to the vibration control device according to the present invention, there can be provided a vibration control device which can automatically suppress vibration of a vibrating body without installing a vibration detection sensor on the vibrating body such as a rotary machine, a reciprocating machine or the like, or the vibration control device, or without controlling a rotational speed or phase of the vibration control device. Furthermore, a low-cost vibration control device can be provided.

DESCRIPTION OF EMBODIMENTS

Figure 1:
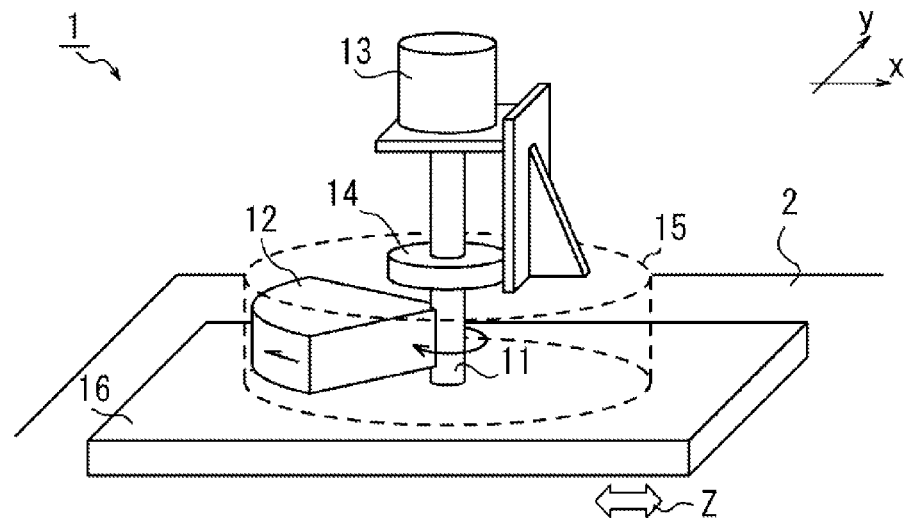
FIG. 1 is a schematic diagram illustrating a vibration control device of an embodiment according to the present invention.

Hereinafter, a vibration control device of an embodiment according to the present invention will be described by referring to the attached drawings. Particularly, the vibration control device installed in a diesel engine for ships (hereinafter referred to as a vibrating body) will be described as an example. FIG. 1 illustrates an outline of the vibration control device 1 of the embodiment according to the present invention. The vibration control device 1 has a rotating shaft 11, a mass body 12 fixed to the rotating shaft 11, a casing 15 for protecting the mass body 12, a clutch 14 installed on the rotating shaft 11, and an activation apparatus (an electric motor, for example) 13 for start-up of the mass body 12 via the clutch 14. Furthermore, the vibration control device 1 has a bottom plate 16 and is installed on the vibrating body (a diesel engine, for example) 2 via this bottom plate 16. The mass body 12 is formed into a thick fan shape (hereinafter referred to as a disk-shaped mass body). The clutch 14 is configured so as to control connection and releasing of the electric motor 13 and the rotating shaft 11. Meanwhile, an arrow indicates a rotation direction of the rotating shaft 11 and the mass body 12, and an outline arrow indicates a vibration direction Z generated in the vibrating body 2.

Here, a diesel engine for ships is assumed to have, for example, a longitudinal size of 5500 to 6700 mm, a lateral size of 3150 to 3800 mm, and a height of approximately 8500 to 10200 mm. Furthermore, the vibration control device 1 is assumed to have a diameter of 400 to 600 mm, a height of 500 to 700 mm, and a weight of approximately 400 to 500 kg, and a mass of the mass body 12 is assumed to be approximately 150 to 250 kg. Furthermore, the engine has, in many cases, a direction in which vibration is particularly strong (the x-axis direction in FIG. 1) due to influences of the number and arrangement of pistons and the like, and its vibration frequency is assumed to be approximately 5 to 20 Hz.

Figure 2:
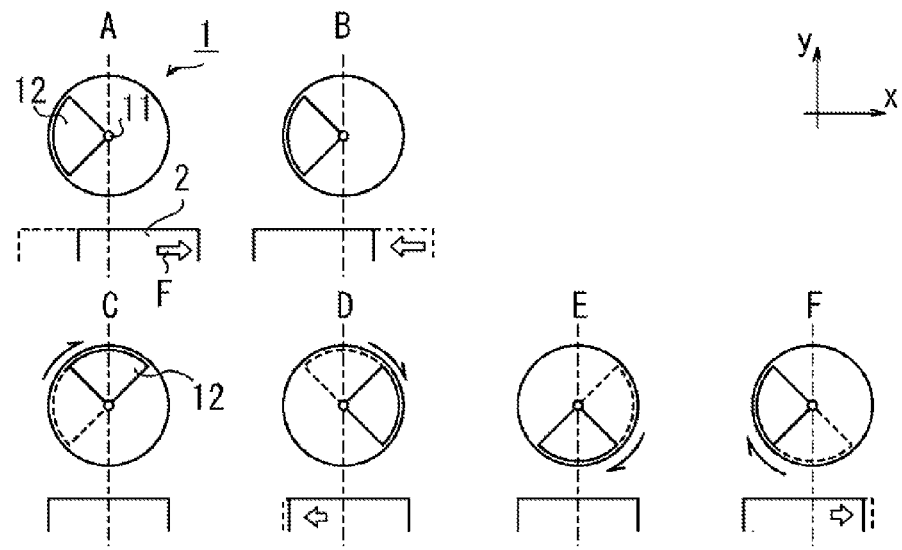
FIG. 2 are plan views illustrating an operation of the vibration control device.

Subsequently, an operation of the vibration control device 1 will be described. FIG. 2 schematically illustrate movement of the vibration control device 1, a state of displacement of the vibrating body 2, and a relationship of a vibration external force F acting on the vibrating body 2. In the first place, when the diesel engine of a ship is started, for example, vibration is generated in the engine (vibrating body 2) (see FIGS. 2A and 2B). After that, a signal for start-up is sent to the electric motor (activation apparatus) 13, and start control is executed (starting step). This electric motor 13 is stopped after being used as the activation apparatus. At this time, the clutch 14 is released, and connection between the electric motor 13 and the rotating shaft 11 is released.

The rotating shaft 11 and the mass body 12 having obtained an initial velocity maintains rotation by using vibration of the engine 2 as power (see a vibration controlling step and FIGS. 2C to 2F). At this time, the mass body 12 automatically rotates so as to cancel the vibration of the engine 2. Specifically, the mass body 12 rotates at a vibration frequency equal to the vibration frequency of the vibration of the engine 2 and also rotates so that the center of gravity of the mass body 12 is in a direction opposite to that of the vibration external force F acting on the engine 2. Meanwhile, as illustrated in FIGS. 2D and 2E, the direction of the vibration external force F is opposite to the direction of displacement of the mass body 12, which is a feature at a vibration frequency higher than a resonance point. Because of the above, even if the vibration frequency is changed with a change in the rotational speed of the engine 2, the rotational speed of the mass body 12 is automatically changed in accordance with this vibration frequency. When the engine 2 is stopped, rotation of the mass body 12 is also automatically stopped, and the vibration control operation is finished (finishing step).

With the above-mentioned configuration, the following working effects can be obtained. First, the vibration control device 1 can be kept stopped in a region where the vibrating body 2 has a vibration frequency lower than the resonance point. Therefore, the vibration control device 1 does not cause a problem, as in the prior-art automatic balancer, in which the amplitude of the vibrating body 2 is increased at the vibration frequency lower than the resonance point. That is because the vibration control device 1 is configured not to operate as long as the initial velocity is not given by the activation apparatus 13.

Second, in a region where the vibrating body 2 has a vibration frequency equal to or higher than the resonance point, the amplitude of the vibrating body 2 can be suppressed. This is because, even if the vibration frequency at which the vibrating body 2 vibrates is high, rotation of the mass body 12 follows the external force and the vibration of the vibrating body 2, and balance can be maintained.

Third, the vibration control device 1 can be provided at a low cost. That is because the vibration control device 1 does not require a sensor or a control mechanism 40 for complicated control. That is, as long as the initial velocity is given, the mass body 12 is automatically rotated at the most suitable rotational speed for suppressing the amplitude of the vibrating body 2 without control after that.

Figure 3:
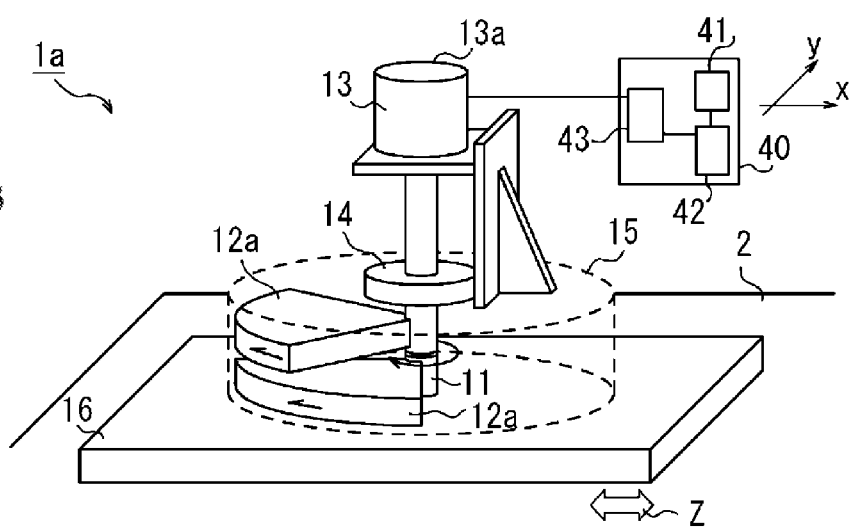
FIG. 3 is a schematic diagram illustrating a vibration control device of another embodiment according to the present invention.

FIG. 3 illustrates an outline of a vibration control device 1a of another embodiment according to the present invention. The vibration control device 1a has two mass bodies 12a. These two mass bodies 12a are arranged so as to be next to each other in a perpendicular direction with respect to the rotating shaft 11. Furthermore, the two mass bodies 12a are installed so as to rotate in a state independent of the rotating shaft 11, respectively. Specifically, it can be configured such that the rotating shaft 11 is made into a double shaft composed of an inner shaft and an outer shaft having a common central axis, that the rotating shaft 11 is made into the double shaft and is further provided with a one-way clutch or the like installed, or that the rotating shaft is made into two independent rotating shafts having different center axes. The relative positional relationship of these two mass bodies 12a is configured so as to be automatically adjusted with the rotation of the mass bodies 12a.

Figure 4:
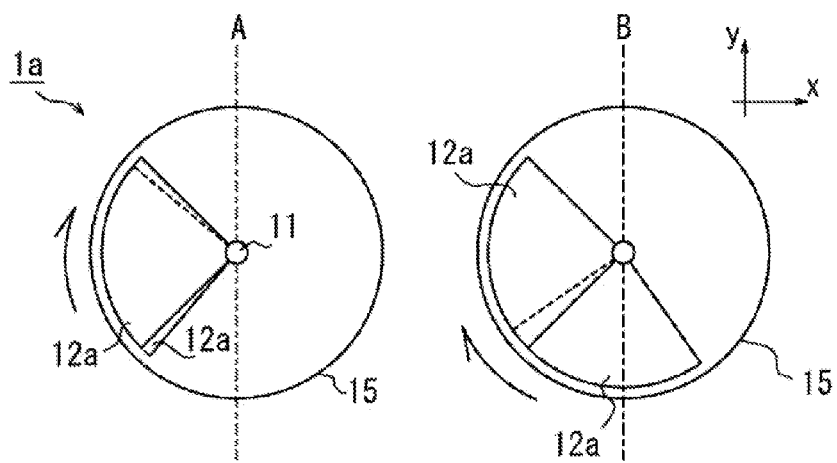
FIG. 4 are plan views illustrating an operation when there are two mass bodies.

Next, an operation of the vibration control device 1a having the two mass bodies 12a will be described. FIG. 4 illustrate planar outlines in a state in which the two mass bodies 12a are rotating. FIG. 4A illustrates a state in which the two mass bodies 12a are automatically adjusted so that most of them overlap with each other in planer view, and FIG. 4B illustrates a state in which the two mass bodies 12a are automatically adjusted so that they are largely shifted in the rotating direction.

When a vibration external force of the vibrating body 2 is large, as illustrated in FIG. 4A, a configuration in which masses of the two mass bodies 12a are concentrated to one point is preferable. On the other hand, when the vibration external force of the vibrating body 2 is small, a configuration in which the masses of the two mass bodies 12a are distributed is preferable. This vibration control device 1a automatically realizes the two states as illustrated in FIG. 4 depending on the magnitude of the vibration external force through the use of the two mass bodies 12a, and even when the magnitude of the vibration external force is changed, the vibration control device 1a can respond to the change of the magnitude by automatic change of relative positions of the two mass bodies 12a.

Furthermore, in order to improve the vibration control performance of this vibration control device, the power assist mechanism 13a is preferably installed. This power assist mechanism 13a is a control mechanism 40 for adding power from a power source (the electric motor 13, for example) to the rotating shaft 11 or the mass body 12 in order to offset the rotation resistance generated in a bearing or the like between the rotating shaft 11 and the casing 15 and can be constituted by the power source (the electric motor 13, for example) and the vibration control device.

This control mechanism 40 has a reading mechanism 41 for detecting a rotational speed of a diesel engine, a control map 42 for determining the power to be added to the rotating shaft 11 or the mass body 12 from the engine rotational speed, and an output control mechanism 43 for outputting the power to be added determined by the control map 42 to the rotating shaft 11 or the mass body 12.

Subsequently, a specific control method for the power assist mechanism 13a will be described. First, the rotational speed of the diesel engine monitored in an engine room is read by the reading mechanism 41 of the power assist mechanism 13a (reading step). Subsequently, from the control map 42 prepared in advance, the power to be added by the electric motor to the rotating shaft with respect to the current engine rotational speed is determined (output determining step). Finally, the determined power to be added is outputted from the electric motor to the rotating shaft by the output control mechanism 43 (output control step). With this configuration, the rotating shaft can apparently rotate without resistance.

Meanwhile, the control mechanism 40 constituting the power assist mechanism 13a may be installed in the vibration control device 1 or may be incorporated in the diesel engine control mechanism 40 or the like in the engine room. Furthermore, the power constituting the power assist mechanism 13a is not limited to the electric motor but can be constituted by known power sources such as a hydraulic motor, an air motor and the like. Moreover, the power assist mechanism 13a and the activation apparatus can make use of the same power source (motor and the like).

With the above-mentioned configuration, the following working effects can be obtained. First, the vibration control performance of the vibration control device can be enhanced. This is because the rotation of the mass body of the vibration control device can be synchronized with the vibration of the vibrating body without a delay in phase. Namely, this is because frictional resistance or the like causing the delay in phase of the mass body can be offset.

Second, the vibration control performance of the vibration control device can be enhanced with low cost. This is because the power source of the power assist mechanism 13a can be shared as power of the activation apparatus. In addition, this is because, with the configuration in which the power to be added to the rotating shaft is estimated from the vibration frequency of the vibrating body (the rotational speed of the diesel engine), a sensor for detecting the rotational speed of the mass body of the vibration control device or a complicated control program is not needed.

Figure 5:
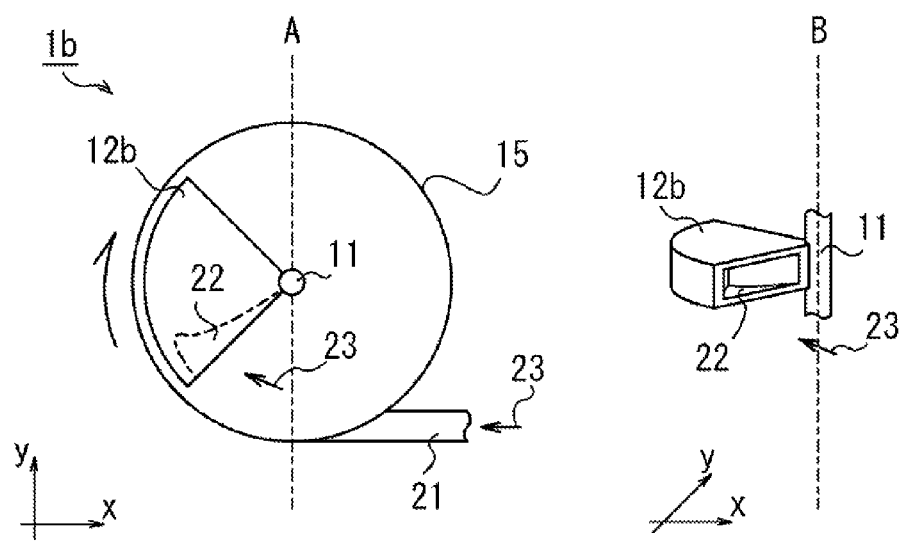
FIG. 5 are schematic diagrams illustrating a vibration control device of still another embodiment according to the present invention.

FIG. 5 illustrate an outline of the activation apparatus of a vibration control device 1b of still another embodiment according to the present invention. FIG. 5A illustrates a plan view of the vibration control device 1b, and FIG. 5B illustrates a perspective view. This vibration control device 1b has a mass body 12b in which a dent portion 22 is formed on a side surface and an activation apparatus constituted by an air nozzle 21 fixed to the casing 15. This vibration control device 1b has a configuration of supplying an air 23 via the air nozzle 21 at start-up and starting rotation of the mass body 12b.

With this configuration, the vibration control device 1b can add a motive power to a position (an outer peripheral side) away from the rotating shaft 11, and thus even the vibration control device 1b on which the mass body 12b with a large mass is mounted can be easily started.

In the case of the vibration control device 1b to be installed in the diesel engine for ships, as the air 23, compressed air for engine start-up, scavenging air boosted by a turbocharger and the like can be used. In addition, it may be configured such that a fluid such as oil or the like is filled in the casing 15 and a flow in the rotating direction is added to this fluid. By the flow of this fluid, start-up of the mass body (activation apparatus) can be realized. Furthermore, the fluid such as the above-mentioned air 23, oil or the like can also be used as the power source for offset of rotation resistance (power assist mechanism 13a).

Furthermore, it may be configured such that a plurality of the air nozzles 21 is installed along a circumference of the casing 15. With this configuration, rotation resistance can be offset without being relatively interrupted, as the power source for the power assist mechanism 13a.

Figure 6:
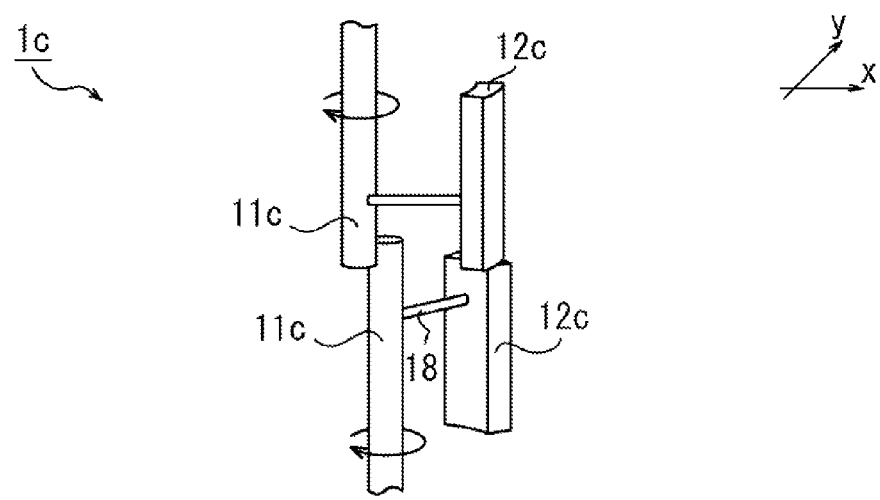
FIG. 6 is a schematic diagram illustrating a mass body of the vibration control device of still another embodiment according to the present invention.

FIG. 6 illustrates a mass body of a vibration control device 1c of still another embodiment according to the present invention. This mass body 12c has a vertically long shape obtained by cutting a part of a pipe into an arc shape (hereinafter referred to as a vertical mass body). This mass body 12c is fixed to a rotating shaft 11c rotating independently so that a relatively free positional relationship can be taken.

With this configuration, the following working effects can be obtained. First, by the configuration in which a rotation radius of the mass body 12c is made small, a high vibration control performance can be exerted for vibration with a high vibration frequency. Second, a high following performance can be exerted for a change in the vibration frequency of the vibrating body. For example, the rotational speed of the mass body of the vibration control device can be caused to follow the vibrating body whose rotational speed is frequently changed, such as an engine of an automobile. In the case of the vibrating body having little change in the rotational speed such as the diesel engine for ships, vibration can be sufficiently controlled even with the disk-shaped mass body as illustrated in FIG. 1.

Figure 7:
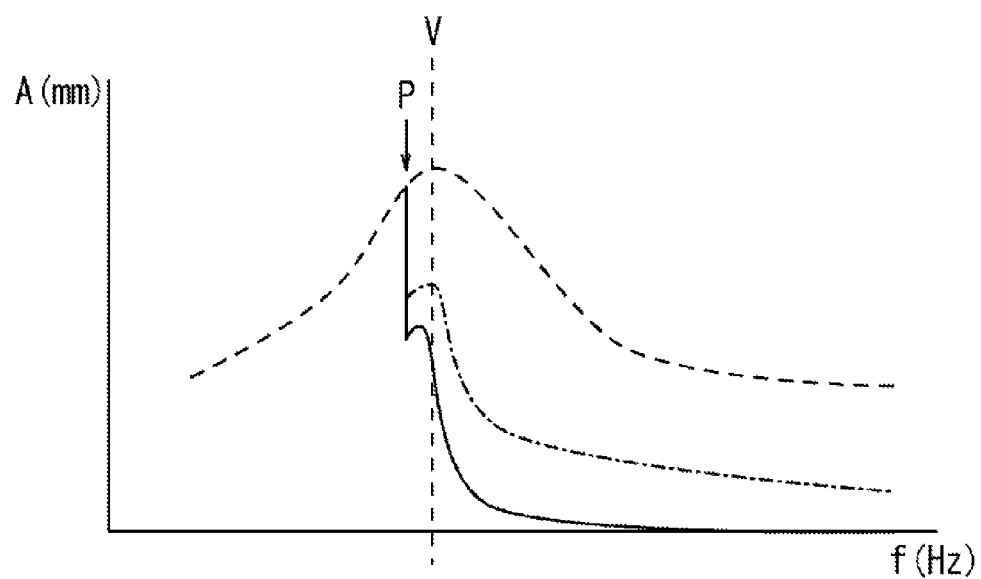
FIG. 7 is a graph illustrating a vibration control performance of the vibration control device.
Figure 8:
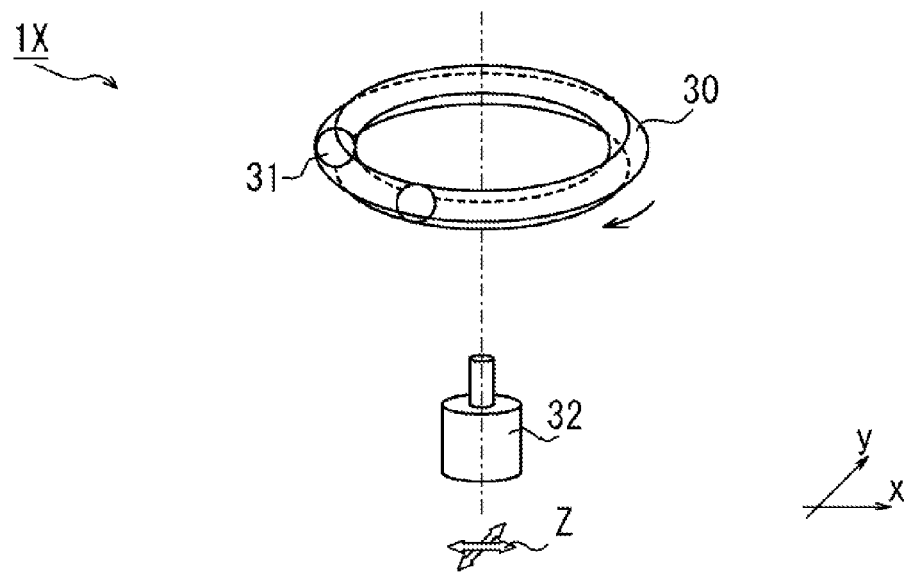
FIG. 8 is a diagram illustrating an outline of a prior-art automatic balancer.

FIG. 7 illustrates a graph indicating the vibration control performance of the vibration control device. The ordinate is amplitude A (mm) of the vibrating body, and the abscissa is a frequency f (Hz). A broken line indicates a case where the vibration control device is not installed, a dashed line indicates a case where the vibration control device is installed, and a solid line indicates a case where the vibration control device having the power assist mechanism 13a is installed. An activation point P indicates a vibration frequency when the mass body of the vibration control device is given the initial velocity to thereby start it, and reference character V denotes a resonant frequency. Meanwhile, the vibration control device may be started after the vibration frequency of the vibrating body (the rotational speed of the engine, for example) is rapidly raised and is caused to pass the resonant frequency V.

As illustrated in FIG. 7, if the vibration control device is started at the activation point P, the amplitude A of the vibrating body is rapidly reduced. That is, the vibration of the vibrating body can be effectively suppressed. The vibration control device of the present invention can exert a high vibration control performance at the vibration frequency higher than the resonant frequency V particularly at which the vibration was difficult to be suppressed. Furthermore, with the use of the vibration control device having the power assist mechanism 13a, an extremely high vibration control performance can be exerted.

As described above, with the vibration control device of the present invention, the vibration of the vibrating body can be effectively suppressed. Meanwhile, the vibrating body to be targeted is not limited to the diesel engine for ships. Specifically, the vibration control device of the present invention can be also applied to a diesel power generator, a turbine for power generation, an electric washing machine, a cutting device, an electric fan, a hard disk and the like, for example. At this time, by using the external force acting on the vibrating body, the amplitude, the vibration frequency of the vibrating body and the like as parameters, the mass of the mass body of the vibration control device, a length from a fulcrum to the center of gravity of the mass body, an inertia moment of the mass body and the like are determined.

REFERENCE SIGNS LIST 1, 1a, 1b, 1c vibration control device
2 vibrating body
11 rotating shaft
12, 12a, 12b, 12c mass body
13 activation apparatus (electric motor)
13a power assist mechanism
15 casing
40 control mechanism
41 reading mechanism
42 control map
43 output control mechanism

The invention claimed is:

1. A vibration control device installed in a vibrating body and controlling vibration of the vibrating body occurring as the result of an external force acting on the vibrating body, the vibration control device comprising:
   a rotatable shaft;
   at least one mass body fixed to the rotating shaft, the at least one mass body being rotatable at a vibration frequency equal to the vibration frequency of the vibration of the vibrating body, and also rotatable so that the center of gravity thereof is in a direction opposite to that of the external force acting on the vibrating body; and
   an activation apparatus selectively couplable to the rotatable shaft to drive the rotating shaft in a rotational motion to impart an initial velocity to the at least one mass body and decouplable from the rotatable shaft after imparting the initial velocity to the at least one mass body.

2. The vibration control device according to claim 1, wherein
   the vibration control device has at least two mass bodies which are rotatable independently of each other and have a structure in which relative positions of the at least two mass bodies in a rotating direction are automatically adjusted.

3. The vibration control device according to claim 1, wherein
   the vibration control device has a power assist mechanism for offsetting rotation resistance of the mass body;
   the power assist mechanism has a power source for adding power to the rotating shaft or the mass body and a control mechanism;
   the control mechanism has a reading mechanism for detecting a vibration frequency of the vibrating body, a control map for determining the power that the power source should add to the rotating shaft or the mass body from the vibration frequency of the vibrating body; and
   an output control mechanism for outputting the determined power to the rotating shaft or the mass body from the power source.

4. A control method for a vibration control device installed in a vibrating body and controlling vibration of the vibrating body and having a rotating shaft, a mass body fixed to the rotating shaft, an activation apparatus, and a power assist mechanism for offsetting rotation resistance of the mass body, wherein vibration of the vibrating body occurs as the result of an external force acting on the vibrating body, and the mass body is rotatable at a vibration frequency equal to the vibration frequency of the vibration of the vibrating body, and also rotatable so that the center of gravity thereof is in a direction opposite to that of a vibration external force acting on the vibrating body, the method comprising:

a starting step of coupling the activation apparatus to the rotating shaft to drive the rotating shaft in a rotational motion to impart an initial velocity to the mass body, a stopping step of decoupling the activation apparatus from the rotating shaft once the mass body obtains the initial velocity, a reading step of reading a vibration frequency of the vibrating body, using the power assist mechanism;

an output determining step of determining the power to be added to the mass body from a control map prepared in advance; and an output control step of adding the power determined in the output determining step to the mass body.

5. The vibration control device according to claim 2, wherein the vibration control device has a power assist mechanism for offsetting rotation resistance of the mass body;

the power assist mechanism has a power source for adding power to the rotating shaft or the mass body and a control mechanism;

the control mechanism has a reading mechanism for detecting a vibration frequency of the vibrating body, a control map for determining the power the power source should add to the rotating shaft or the mass body from the vibration frequency of the vibrating body; and an output control mechanism for outputting the determined power to the rotating shaft or the mass body from the power source.

\* \* \* \* \*